March 17, 1936. J. O. LEMAY 2,034,476
WHEEL AXLE MOUNTING FOR MOTOR VEHICLES
Filed Feb. 25, 1935 2 Sheets-Sheet 1
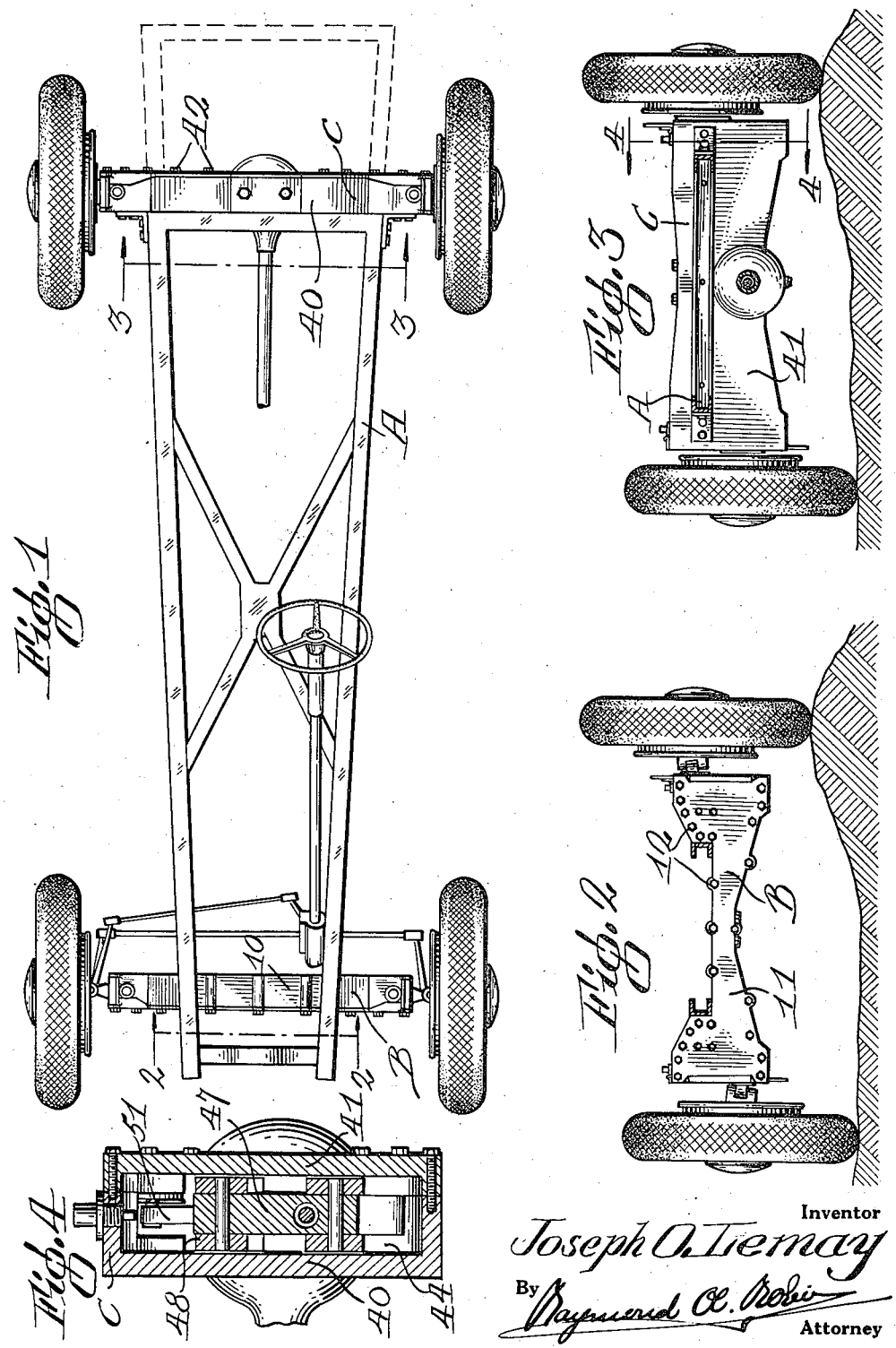
Inventor
Joseph O. Lemay
By
Attorney

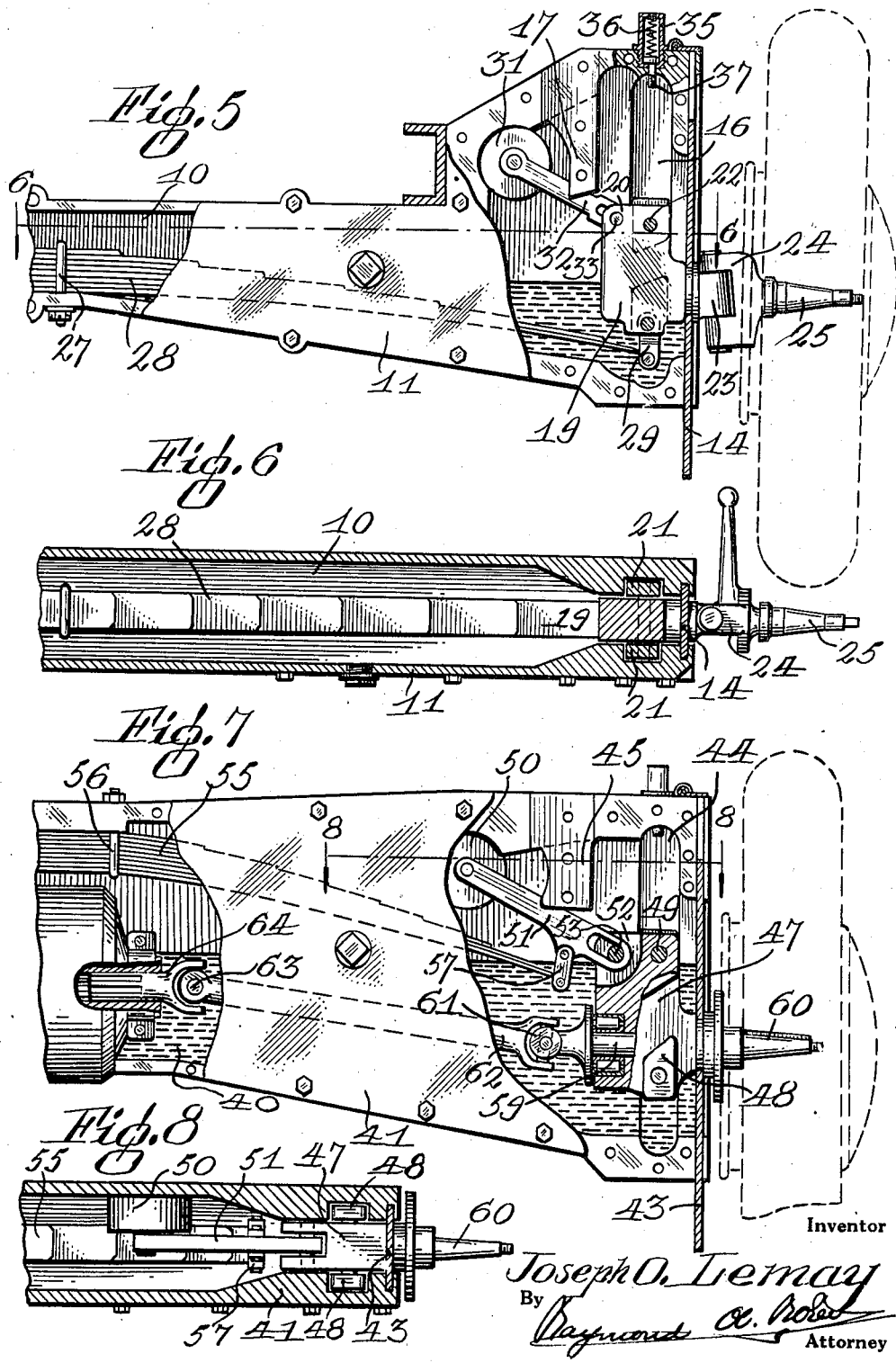

Patented Mar. 17, 1936

2,034,476

UNITED STATES PATENT OFFICE 2,034,476

WHEEL AXLE MOUNTING FOR MOTOR VEHICLES

Joseph O. Lemay, Montreal, Quebec, Canada

Application February 25, 1935, Serial No. 8,098

3 Claims. (Cl. 280—106.5)

The present invention relates to improvements in wheel axle mountings for motor vehicles.

An object of the present invention is the provision of an improved structure for providing independently strong wheel mountings for motor vehicles.

A further object of the invention is the provision of an axle mounting embodying a hollow support structure, a relatively movable spindle carrier and a spring suspension assembled to form a unit which may be detachably connected with a chassis frame.

Another object of the invention is the provision of an assembly of the aforesaid character wherein the spindle carrier and supporting spring are disposed in a tightly enclosed housing adapted to contain lubricant whereby the movable elements and the spring are retained in a well lubricated condition.

Another object of the invention is the provision of an independently suspended axle mounting having means connected therewith for dampening the spring action.

A still further object of the invention is the provision of an independently suspended axle assembly which is relatively simple, durable and compact in construction.

Other objects and advantages of the invention will become apparent as the description progresses.

In the accompanying drawings forming a part of this specification and in which like reference characters are employed to designate corresponding parts throughout the same:—

Figure 1 is a top plan view of a motor vehicle chassis showing the improved axle assembly mounted in the front and rear thereof, Figure 2 is a transverse sectional view taken on the line 2—2 of Figure 1, Figure 3 is a similar section taken on the line 3—3 of Figure 1, Figure 4 is an enlarged vertical section taken on the line 4—4 of Figure 3, Figure 5 is a fragmentary side elevation of the front axle assembly with the cover plate partly broken away.

Figure 6 is a longitudinal section taken on the line 6—6 of Figure 5,

Figure 7 is a fragmentary side elevational view of the rear axle assembly with parts broken away to show the interior construction, and Figure 8 is a longitudinal section on the line 8—8 of Figure 7.

Referring to the drawings, wherein for the purpose of illustration is shown a preferred embodiment of the invention, A generally designates the chassis frame of a motor vehicle. To the front end of the frame A is connected a front axle assembly, generally indicated at B.

The front axle assembly B embodies an elongated hollow axle of rectangular cross section having a diminishing taper toward the centre and vertically elongated at the ends. This axle forms a housing consisting of a channel-shaped body section 10 which includes an integral side wall and top and bottom walls. One side of the housing, which may be disposed toward the front or the rear of the vehicle, embodies a removable side cover plate 11 securely attached to the body by bolts 12. The body of the axle housing is open at the ends, as shown at Figures 5 and 6. In the opposed side walls of the axle are formed relatively narrow channels disposed adjacent to and inwardly of the ends and slidably receive therein the edge margins of an end covering plate 14 which is of a suitable length to retain the open ends of the housing closed at all times.

As shown to advantage at Figures 5 and 6, the hollow axle or housing is formed so that the walls are of increased thickness at the ends and are provided with oppositely disposed vertically elongated guide grooves 16. In the top of the elongated portion of each end of the housing is formed a depending slotted guide arm 17.

Slidably mounted in each end portion of the axle is an elongated rectangular shaped block 19 formed with a slot 20 at the upper inner corner. To the opposed sides of the block 19 are connected a pair of elongated substantially rectangular shaped guide pieces 21 attached to the block by means of pins 22. The guide pieces 21 are preferably flat and fitted to slidably engage the grooves 16 in the side walls of the axle. To a projection at the lower outer edge of each block 19 is connected a knuckle bearing eye 23 having the short shank extending through a circular opening in the end cover plate 14 so that the eye projects outwardly at one end of the hollow axle. Connected with the knuckle bearing 23 by the usual bolt connection is a knuckle jaw 24 having a horizontally projecting wheel carrying spindle 25 formed thereon.

Extending longitudinally in the bottom of the hollow axle and secured to the central portion thereof by means of U-bolts 27 is a semi-elliptic leaf spring 28 having each end connected to a shackle 29 fastened to and projecting downwardly of each side block 19. Thus, each end of the spring 28 forms an independent suspension for the spindle carrying block.

In the enlarged portion at each end of the axle is secured a dampening device 31 having a radial arm 32 connected therewith and disposed to swing vertically in the housing. The outer end of the arm 32 is slotted and is secured within the vertical slot 20 in the slide block by means of a pin 33, so that the device 31 functions to dampen the action of the spring 28. As shown to advantage at Figure 5, the intermediate portion of the dampener arm 32 moves vertically in the slotted depending arm 17.

In the top of the housing, in vertical alignment with the slide block 19 therein, is mounted a cushioning device embodying a cylinder 35 having a compression spring 36 fitted therein and provided at the bottom with a plunger 37 which projects below the opening in the cylinder so as to contact with the top of the slide block when the block is at the upper end of its stroke to cushion the same.

At the rear of the vehicle chassis frame B is secured a rear axle assembly, generally indicated at C, embodying an elongated rear axle housing of vertically elongated rectangular cross section composed of a body section 40 having integral top, side and bottom walls. The opposite side wall, indicated at 41, is in the form of a side wall plate removably secured to the body by bolts 42. The open ends of the rear axle housing are covered by vertically slidable end cover plates 43 fitted in grooves in the end portion of the housing and movable in the same manner as the end cover plates of the front assembly. In the end portions of the housing side walls are formed transversely opposed vertically elongated guide grooves 44. A slotted arm 45, formed integral with the top wall of the housing, is arranged inwardly of the grooves 44.

Within each end of the housing is mounted a vertically movable bearing block 47 of vertically elongated rectangular form provided in the bottom portion with a horizontal bore. To the opposed side faces of the block 47 are connected flat elongated guide pieces 48 secured to the block by pins 49 adapted to be slidably fitted in the grooves 44 to vertically guide the block. In the upper portion of the rear housing is mounted a dampening device 50 having a radially projecting 51 connected therewith and disposed to swing vertically in the housing. The outer end of the dampener arm 51 is slotted and projects into a slot 52 in the upper part of the bearing block, a pin 53 being extended through the block and through the slot in the arm to connect the arm with the block.

A semi-elliptic leaf-spring 55 extends longitudinally in the rear axle housing and is secured to the central portion of the top wall by U-bolts 56. Each end portion of the spring 55 is connected with the intermediate portion of the dampener arm 51 by means of a shackle 57.

Within the transverse bore in the bottom of the bearing block 47 is journalled a stub shaft 59 provided at one end with an outwardly projecting wheel engaging spindle 60. To the inner end of the stub shaft 59 is connected one section of a universal joint 61. Connected with the universal joint 61 and extending longitudinally in the housing is a connecting shaft 62 having the inner end portion connected with a second universal joint 63 which joins the shaft with a stub shaft 64 connected with the differential gearing. As shown to advantage at Figures 3 and 7, the differential gearing is mounted at the central portion of the rear axle housing. The stub shaft 64 has a keyed sliding connection with the differential gearing so that an efficient flexible rear drive is provided.

The front and rear axle assemblies are constructed so as to enable removal from or attachment of the chassis frame as compact units. When the removable cover forming side wall of the axle housing is bolted in position, the slide blocks, dampening device and spring are effectively protected from dirt and water and a lubricant, such as oil or grease, is poured into the enclosed housing so as to approximately half fill the same. The upper movable parts in the housing are lubricated by the splash of the lubricant.

It is to be understood that the form of my invention herein shown and described is to be taken as a preferred example of the same and that various changes as to the shape, size and arrangement of parts may be resorted to without departing from the spirit of the invention or the scope of the subjoined claims.

Having thus described my invention, I claim:—

1. In independent springing means for the wheels of a motor vehicle having a frame, a casing secured transversely to the frame and constituting a hollow axle adapted to hold a fluid lubricant, blocks slidable vertically inside the axle at the outer ends thereof, between thickened portions forming slide-ways, guiding blocks at the top and bottom of said sliding blocks to properly guide the same in channels cut vertically in the thickened portions of the axle, a transverse spring supporting said blocks, a lubricant sealing plate slidable in grooves of the axle to close the outer ends thereof, and wheel-carrying spindles mounted on said blocks and projecting outwardly therefrom.

2. In combination with the frame of a motor vehicle, an independent wheel springing comprising a casing secured transversely to the frame, a transverse spring inside said casing and secured at its center to the casing, vertically sliding plates at the ends of the casing to adapt the same to receive a fluid lubricant, main blocks slidable within the ends of said casing, secondary blocks slidable in channels cut in the casing to vertically guide the main blocks, said main blocks being shackled to the spring ends, and wheel spindles secured to the main blocks and extending through the sealing plates.

3. A wheel suspension of the character described, comprising a longitudinal casing formed of parallel vertical longitudinal members, bottom and top plates secured to said members so as to form a quadrangular casing adapted to hold a fluid lubricant, sealing end plates slidable vertically in slots provided at the ends of the members, blocks slidable between the parallel ends of the casing, means co-operating with the ends of the casing for vertically guiding the blocks, spring means disposed longitudinally in the casing to urge the blocks downwardly, and wheel spindles projecting through the sealing plates and secured to the blocks.

JOSEPH O. LEMAY.